United States Patent

Bojan

(10) Patent No.: US 12,014,447 B2
(45) Date of Patent: Jun. 18, 2024

(54) METHOD AND SYSTEM FOR DYNAMIC CROPPING OF FULL BODY POSE IMAGES

(71) Applicant: Revieve Oy, Helsinki (FI)

(72) Inventor: Thiyagarajan Manihatty Bojan, Espoo (FI)

(73) Assignee: Revieve Oy, Helsinki (FI)

( * ) Notice: Subject to any disclaimer, the term of this patent is extended or adjusted under 35 U.S.C. 154(b) by 361 days.

(21) Appl. No.: 17/674,495

(22) Filed: Feb. 17, 2022

(65) Prior Publication Data

US 2023/0260166 A1   Aug. 17, 2023

(51) Int. Cl.
*G06T 11/00*    (2006.01)
*G06T 3/10*    (2024.01)
(Continued)

(52) U.S. Cl.
CPC ............. *G06T 11/00* (2013.01); *G06T 3/10* (2024.01); *G06T 7/11* (2017.01); *G06T 7/73* (2017.01); *G06V 10/225* (2022.01); *G06V 40/161* (2022.01); *G06T 2207/20021* (2013.01); *G06T 2207/20132* (2013.01); *G06T 2207/30201* (2013.01); *G06T 2210/12* (2013.01)

(58) Field of Classification Search
CPC ... G06T 11/00; G06T 3/10; G06T 7/11; G06T 7/73; G06T 2207/20021; G06T 2207/20132; G06T 2207/30201; G06T 2210/12; G06V 10/225; G06V 40/161; G06V 40/165
See application file for complete search history.

(56) References Cited

U.S. PATENT DOCUMENTS 8,027,521 B1   9/2011   Moon et al.
2011/0299776 A1   12/2011   Lee et al.
(Continued)

OTHER PUBLICATIONS

Borza Diana et al: "A Deep Learning Approach to Hair Segmentation and Color Extraction from Facial Images", Sep. 25, 2018 (Sep. 25, 2018), SAT 2015 18th International Conference, Austin, TX, USA, Sep. 24-27, 2015; [Lecture Notes in Computer Science; Lect.Notes Computer], Springer, Berlin, Heidelberg, pp. 438-449, XP047487029, ISBN: 978-3-540-74549-5 [retrieved on Sep. 25, 2018] * the whole document *.

(Continued)

*Primary Examiner* — Ping Y Hsieh
(74) *Attorney, Agent, or Firm* — Ziegler IP Law Group

(57) ABSTRACT

Disclosed is method for dynamic cropping of full body pose (FBP) image, method comprising: receiving in computing device FBP image from image resource, wherein FBP image comprises face; detecting in received FBP image area of face by bounding box; detecting coordinates of corner points of bounding box; performing distance approximation of detected area of face in received FBP image; cropping distance approximated area of face of FBP image; performing coordinates mapping transformation of cropped FBP image by mapping coordinates of cropped FBP image to received FBP image; segmenting region of hair of cropped FBP image; masking region of hair of cropped FBP image for obtaining hair polymask; and applying masked FBP image to received FBP image according to performed coordinates mapping for obtaining the dynamically cropped FBP image.

6 Claims, 6 Drawing Sheets

(51) Int. Cl.
    *G06T 7/11*     (2017.01)
    *G06T 7/73*     (2017.01)
    *G06V 10/22*    (2022.01)
    *G06V 40/16*    (2022.01)

(56) References Cited

U.S. PATENT DOCUMENTS

| | | | |
|---|---|---|---|
| 2018/0046855 A1* | 2/2018 | Ganong | G06V 40/171 |
| 2018/0157939 A1 | 6/2018 | Butt et al. | |
| 2022/0121839 A1* | 4/2022 | Tagra | G06V 40/172 |
| 2022/0160260 A1* | 5/2022 | Ryu | A61B 5/742 |

OTHER PUBLICATIONS

European Patent Office, extended European search report, Application No. 23153201, filed May 26, 2023, 10 pages.
Li Jianshu Jianshu@U Nus Edu et al: "Integrated Face Analytics Networks through Cross-Dataset Hybrid Training", Proceedings of the 25th ACM International Conference on Multimedia, ACMPUB27, New York, NY, USA, Oct. 23, 2017 (Oct. 23, 2017), pp. 1531-1539, XP058620094, DOI: 10.1145/3123266.3123438 ISBN: 978-1-4503-8450-6 * the whole document *.

* cited by examiner

METHOD AND SYSTEM FOR DYNAMIC CROPPING OF FULL BODY POSE IMAGES

TECHNICAL FIELD

The present disclosure relates to methods for dynamic cropping of full body pose images. The present disclosure also relates to systems for dynamic cropping of full body pose images. The present disclosure also relates to computer programs for dynamic cropping of full body pose images.

BACKGROUND

In recent times, hair analysis tools have been developed to determine hair properties, such as colour, type, frizziness and volume. Such hair analysis tools are known in the beauty industry. Results obtained by such hair analysis tools may be used to suggest hair care products to a user for improving a look and feel of the hair. For example, based on a determined hair property, a hair care product may be recommended to the user which would suit the user's hair. Thus, the hair analysis tools act as an aid in recommending an appropriate hair care product for each individual. Often, such hair analysis tools utilize pictures of the user to assess the user's hair. Herein, the pictures may be provided by the user on-the-spot using a camera, or the user may even utilize an old picture for hair analysis.

Determination of hair properties is majorly influenced by multiple factors in the pictures, including but not limited to, lighting conditions, shadows, photo quality. For example, a picture with indoor lighting may represent hair properties differently than a picture with outdoor lighting. Therefore, it is difficult for existing tools to provide accurate determination of hair pixels and hair region in a given picture and make correct conclusions regarding the hair properties.

The pictures of the user may represent the user in various conditions, typically depending on a distance between the user from the camera at the moment when the picture was taken. Thus, the picture contains in addition to a given user's facial and hair area, also other irrelevant information. Moreover, the further the user is from the camera, the more irrelevant information the picture may contain. This is especially critical when the picture of the user represents the user in a Full Body Pose (FBP).

Herein, in order to determine the hair properties from the picture of the user, the hair area needs to be segmented. However, in a Full Body Pose (FBP) image, a lot of other non-hair related information, i.e., irrelevant information, is contained. Thus, when the FBP image is provided as an input to a segmentation algorithm of the existing hair analysis tools, the segmentation algorithm fails to segment the hair correctly. Moreover, the presently available solutions either involves face detection and performing a static cropping of the image, ignoring of the FBP images such that the system only inputs selfie images, or training of a deep learning model to identify hair regions. However, none of these solutions accurately and dynamically segment the FBP images.

Therefore, in light of the foregoing discussion, there exists a need to overcome the aforementioned drawbacks associated with segmenting information by dynamically cropping a full body pose image.

SUMMARY

The present disclosure seeks to provide a method for dynamic cropping of a full body pose image. The present disclosure also seeks to provide a system for dynamic cropping of a full body pose image. The present disclosure also seeks to provide a computer program for dynamic cropping of a full body pose image. An aim of the present disclosure is to provide a solution that overcomes at least partially the problems encountered in prior art.

In one aspect, an embodiment of the present disclosure provides a method for dynamic cropping of a full body pose image, the method comprises: receiving in a computing device a full body pose image from an image resource, wherein the full body pose image comprises a face; detecting in the received full body pose image an area of the face by a bounding box; detecting coordinates of corner points of the bounding box of the area of the face; performing distance approximation of the detected area of the face in the received full body pose image; cropping the distance approximated area of the face of the full body pose image; performing coordinates mapping transformation of the cropped full body pose image by mapping coordinates of the cropped full body pose image in relation to the received full body pose image; segmenting a region of hair of the cropped full body pose image; masking the region of the hair of the cropped full body pose image for obtaining a hair polymask of the region of the hair; and applying the masked full body pose image to the received full body pose image according to the performed coordinates mapping for obtaining the dynamically cropped full body pose image.

In another aspect, an embodiment of the present disclosure provides a system for dynamic cropping of a full body pose image, the system comprises a computing device and an image resource, wherein the computing device is configured to carry out the steps of the method according to the aforementioned aspect.

In yet another aspect, an embodiment of the present disclosure provides a computer program for dynamic cropping of a full body pose image comprising instructions adapted to perform the method according to the aforementioned aspect, when the computer program is executed by a system comprising a computing device.

Embodiments of the present disclosure substantially eliminate or at least partially address the aforementioned problems in the prior art, and enable accurate and high-quality dynamic cropping of full body pose images. Additional aspects, advantages, features and objects of the present disclosure would be made apparent from the drawings and the detailed description of the illustrative embodiments construed in conjunction with the appended claims that follow. It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

DETAILED DESCRIPTION OF EMBODIMENTS

Figure 1:
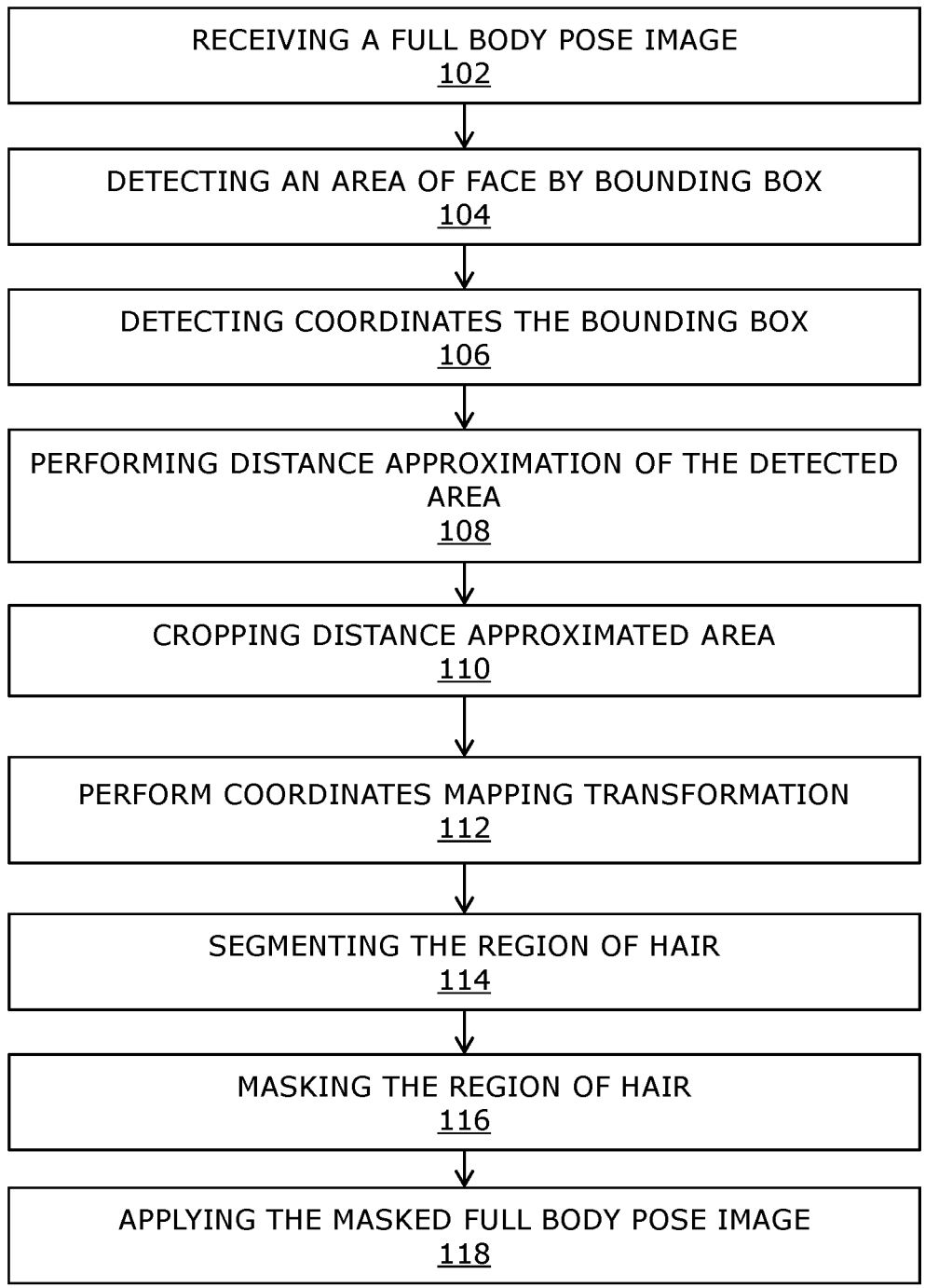
FIG. 1 illustrates a flowchart depicting steps of a method for dynamic cropping of a full body pose image, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a method for dynamic cropping of a full body pose image, the method comprises: receiving in a computing device a full body pose image from an image resource, wherein the full body pose image comprises a face; detecting in the received full body pose image an area of the face by a bounding box; detecting coordinates of corner points of the bounding box of the area of the face; performing distance approximation of the detected area of the face in the received full body pose image; cropping the distance approximated area of the face of the full body pose image; performing coordinates mapping transformation of the cropped full body pose image by mapping coordinates of the cropped full body pose image in relation to the received full body pose image; segmenting a region of hair of the cropped full body pose image; masking the region of the hair of the cropped full body pose image for obtaining a hair polymask of the region of the hair; and applying the masked full body pose image to the received full body pose image according to the performed coordinates mapping for obtaining the dynamically cropped full body pose image.

In another aspect, an embodiment of the present disclosure provides a system for dynamic cropping of a full body pose image, the system comprises a computing device and an image resource, wherein the computing device is configured to carry out the steps of the method according to the present disclosure.

In yet another aspect, an embodiment of the present disclosure provides a computer program for dynamic cropping of a full body pose image comprising instructions adapted to perform the method according to the present disclosure, when the computer program is executed by a system comprising a computing device.

The present disclosure provides the aforementioned method, system and computer program for dynamic cropping of a full body pose image. Herein, the method detects the area of the face by using a bounding box, performs distance approximation on the same and crops the distance approximated area to segment the region of hair in a given full body pose image. By dynamically cropping the full body pose image based on distance approximation, the segmentation accuracy and quality is improved since the segmented image does not contain irrelevant information and only focuses on the region of hair. This in turn, allows for an accurate hair quality analysis.

It will be appreciated that the method dynamically crops the full body image to a required image using distance approximation to increase segmentation accuracy. This increase in the segmentation accuracy facilitates in precisely segmenting a given body part represented in the full body pose image, for further processing and analysis as per requirement. Throughout the present disclosure, the term "dynamic cropping" refers to unique cropping of a given full body pose image, depending on a distance between a given camera and a given face when the given full body pose image was captured. Herein, the cropping is performed differently for different full body pose images. For example, a first full body pose image may be cropped such that the cropped image highlights the top right portion of the first full body pose image. Optionally, the method is a computer-implemented method. This means that the method is implementable as a computer program (i.e., software or application) that is executable on the computing device. Moreover, a full body pose image is an image having a full body pose of at least one of: a human, an animal. The full body pose refers to a pose containing a full body of the at least one of: the human, the animal. For example, the full body pose image of the human may show the human's entire body including their face, their hair, their legs, their torso, their arms, etc.

Throughout the present disclosure, the term "computing device" refers to a device capable of processing images. Optionally, the method is performed via the computing device. Examples of the computing device include, but are not limited to, a server, a computer, a smartphone, a tablet, a phablet, a laptop, and a smart watch. Optionally, the computing device comprises a processor, wherein the processor is configured to perform the method. The processor refers to hardware, software, firmware, or a combination of these configured to control operation of the aforementioned computing device. In this regard, the processor performs several complex processing tasks. The processor is communicably coupled to other components of the computing device and to the image resource wirelessly and/or in a wired manner. Optionally, the processor is configured to receive the full body pose image from the image resource. Optionally, the computing device further comprises a memory. It will be appreciated that processed data is stored at the memory. The memory may be a local memory that is integrated with the processor, may be an external memory, may be a cloud-based memory, or similar. Optionally, the computing device further comprises an interactive display. More optionally, a user interface is rendered on the interactive display. Herein, a user utilizes the user interface to provide the full body pose image (i.e., input) to the computing device for performing the method. Moreover, the dynamically cropped full body pose image (i.e., output) is provided to the user via the user interface.

Throughout the present disclosure, the term "image resource" refers to a device which is capable of capturing, obtaining and/or storing the full body pose image. Optionally, the image resource is implemented as at least one of: a camera of the computing device, a stand-alone camera, the memory. Herein, the full body pose image is received in the computing device from the image resource by at least one of: transfer from a camera, transfer from a camera of a user device, download from a website, upload from another device, captured by a camera of the computing device. Optionally, the image resource is communicably coupled to the computing device using a communication means. The communication means is implemented as at least one of: a wireless communication means, a wired communication means. Examples of the wireless communication means include, but are not limited to, Wireless fidelity network (Wi-Fi), Bluetooth, internet, cell phone network, wireless local area network (WLAN). Examples of the wired communication means include, but are not limited to, telephone networks, cable network, television network, and fiber-optic network.

Optionally, the processor is configured to detect the area of the face in the full body pose image by employing at least one object detection algorithm. Optionally, the at least one object detection algorithm is at least one of: a DLib algorithm, a cascade algorithm, a region-based convolutional network method (R-CNN) algorithm, a histogram of oriented gradients (HOG) algorithm, a region-based fully convolutional networks (R-FCN) algorithm, a single shot detector (SSD) algorithm, a spatial pyramid pooling (SPP-net) algorithm, a you-only-look-once (YOLO) algorithm. The bounding box refers to an imaginary box (i.e., a rectangle) which acts as a point of reference for detecting the area of the face in the full body pose image. Herein, the bounding box is defined using coordinates in a two-dimensional space (for example, X and Y coordinates), since images are represented in two dimensions. In an example, a detected area of the face may be represented with the bounding box being a rectangle having the coordinates of its corner points (i.e., a first set of coordinates) as X1, Y1; X2, Y2; X3, Y3; and X4, Y4. In a first example, values of dimensions of a full body pose image in pixels may be 1181×789, such that dimensions of a corresponding bounding box in pixels may be 661×661.

It will be appreciated that the full body pose image is represented in two-dimensional coordinates. Since the bounding box is defined using the first set of coordinates, the coordinates of corner points of the bounding box are determined by mapping the bounding box with respect to the full body pose image using coordinates of the full body pose image. Referring to the first example, the coordinates of the corner points of the bounding box may be 98, 289; 98, 950; 759, 289; 759, 950. Moreover, a size of the area of the face varies depending on at least one of: a size of the full body pose image, a distance of the face from a camera which captured the full body pose image. The size of the area of the face depends on the size of the full body image, since a big full body pose image (i.e., high-definition) having a lot of detail would result in a bigger and more detailed area of the face as compared to a small full body pose image (i.e., low-definition) which would result in a smaller and less detailed area of the face. Moreover, the size of the area of the face depends on the distance of the face from the camera which captured the full body pose image, since when the face is at a farther distance from the camera, the size of the area of the face may be smaller as compared to when the face is at a closer distance from the camera, wherein the size of the area of the face may be smaller.

The term "distance approximation" refers to the act of approximating a distance of the detected area. Optionally, the processor is configured to perform distance approximation of the detected area of the face in the received full body pose image by employing at least one approximation algorithm.

Optionally, the distance approximation of the detected area of the face comprises: computing a difference C of a width of the bounding box by calculating absolute value of a difference of a second coordinate of the detected area of the face and a first coordinate of the detected area of the face; performing normalization of the computed difference C; and comparing the normalized differences with a pre-determined minimal difference C threshold and a pre-determined maximal difference C threshold.

Optionally, the width of the bounding box is at least one of: a horizontal width, a diagonal width. Optionally, the distance approximation of the detected area of the face is computed by the processor of the computing device. Herein, the processor is configured to determine a difference of the width of the bounding box by using following formula:

$$C = abs(x_{max} - x_{min})$$

wherein:

C: refers to the difference of the width;

abs: refers to a function to achieve an absolute (positive integer) value;

$x_{max}$: refers to a maximum horizontal coordinate of the bounding box; and $x_{min}$: refers to a minimum horizontal coordinate of the bounding box.

In a first example, if $x_{max}$ is 759 and $x_{min}$ is 289, C=abs (759−289). So, C=abs (661), resulting in C=661.

Subsequently, the difference C of the width of the bounding box is normalized to represent values between 0 and 1. This is done such that each full body image may be optimally cropped based on the normalized difference. Optionally, the normalization of the computed difference C is performed by the processor of the computing device. Herein, the processor is configured to normalize the difference C by using following formula:

$$C_{normalized} = (C - x_{min})/(x_{max} - x_{min})$$

wherein:

$C_{normalized}$: refers to the normalized difference of the width;

C: refers to the difference of the width;

$x_{max}$: refers to a maximum horizontal coordinate of the bounding box; and $x_{min}$: refers to a minimum horizontal coordinate of the bounding box.

Pursuant to the first example, if $x_{max}$ is 759 and is $x_{min}$ 289, C=661, then $$C_{normalized} = (661 - 289)/(759 - 289),$$

$$C_{normalized} = 563/661,$$

So, $C_{normalized} = 0.85$.

Moreover, the normalized difference is compared with the pre-determined minimal difference C threshold and the pre-determined maximal difference C threshold to identify a need and/or an amount of cropping required for the full body pose image. Herein, if the normalized difference is less than the pre-determined minimal difference C threshold, then the area of the face is not detected; and if the normalized difference is equal or more than the pre-determined maximal difference C threshold, then no cropping is performed. For the normalized difference C, optionally, a pre-determined minimal difference C threshold is 0 and a pre-determined maximal difference C threshold is 1. This means that optionally, a value of the normalized difference lies in a range of 0-1. For example, the value of the normalized difference may lie in a range of 0, 0.05, 0.15, 0.25, 0.35, 0.5 or 0.7 up to 0.5, 0.7, 0.85, 0.95 or 1. Moreover, subsequently, the normalized difference is utilised as a crop offset. In pursuance to the first example, since $C_{normalized}$=0.85, the comparison may result in this that the area of the face is detected, and cropping is required to be performed.

A technical advantage of performing the distance approximation of the detected area of the face is that it accurately provides simple metrics which indicate whether or not cropping is required, and when it is indicated that the cropping is required, further indicates an amount of cropping required for a given full body pose image. These metrics are provided prior to any actual cropping being conducted, such that the method is accurate, robust and time-saving. Another technical advantage of this is that since the distance approximation is being performed individually for each full body pose image, the method is dynamically calculating cropping (including requirement, and/or amount) of the full body pose image.

Optionally, the processor is configured to crop the distance approximated area of the face of the full body pose image by employing at least one image cropping algorithm. This cropped area is defined by the detected area of the face in the received full body pose image. For example, a distance between a given face and a given camera capturing the given full body pose image. If a user is close to the given camera, the face captured in the given full body pose image is big, and the value of the normalized difference is large as well. Pursuant to the first example, if $C_{normalized}$=0.85, only 15% of area in the given full body pose image is required to be cropped out.

Optionally, the cropping of the distance approximated area of the face of the full body pose image comprises: generating a second set of coordinates, wherein the generated second set of coordinates define corner points of a rectangle of a cropping area. Herein, the second set of coordinates pertain to cropping region coordinates. Optionally, the cropping area is implemented as at least one of: a fixed size bounding box, a dynamically changing bounding box based on a cropping preference. Optionally, the method is customisable based on user preference. In an example, a distance between the face and the given camera while capturing the given full body pose image is manually customisable (by moving the given camera and/or moving the face). In another example, cropping options are digitally customisable by setting profile customisations, giving command, etc.

Optionally, generation of the second set of coordinates comprises: receiving the first set of coordinates and mapping them onto the detected area of the face; selecting a cropping preference indicating a cropping area; measuring distances between the cropping area and the detected area of the face in each direction; and selecting neighbouring pixels based on the first set of coordinates and the distances between the cropping area and the detected area.

Herein, the second set of coordinates enable the processor to obtain the dynamically cropped full body pose image. Cropping area is calculated based on the normalized difference (i.e., the crop offset, which approximates and covers most of a hair, face and shoulder region).

Figure 6:
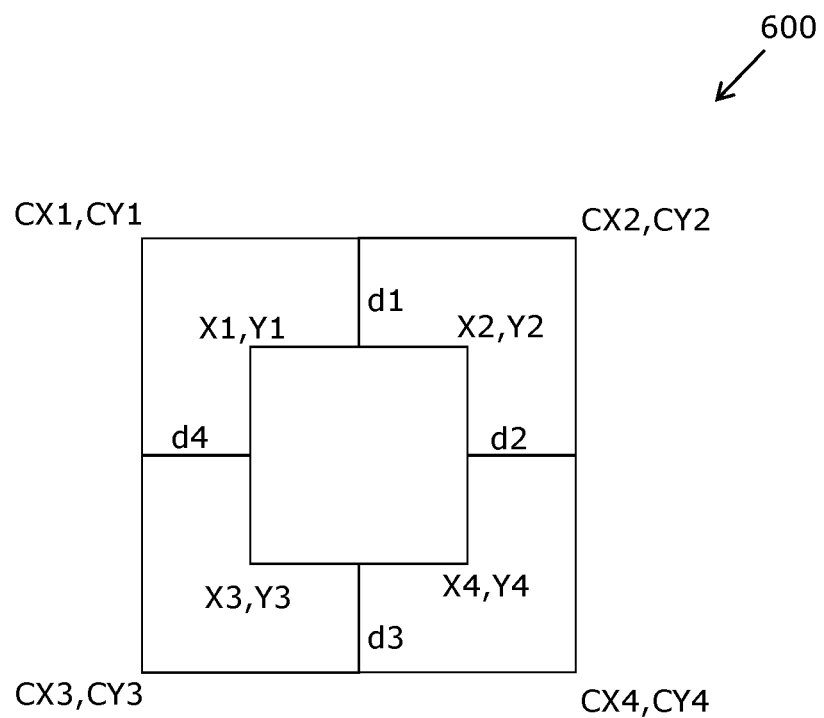
FIG. 6 illustrates a step of distance approximation of a detected area of a face of a method for dynamic cropping of a full body pose image, in accordance with an embodiment of the present disclosure.

An exemplary generation of the second set of coordinates (i.e., cropping region coordinates CX1, CX2, CX3, CX4; CY1, CY2, CY3, CY4) from the first set of coordinates (i.e., X1, X2, X3, X4; Y1, Y2, Y3, Y4) is shown in FIG. 6. Subsequently, the cropping area is indicated and distances between the cropping area and the detected area of the face are measured (i.e., d1, d2, d3, d4). Often d1, d2, d3, d4 are equal, especially in cases of equilateral distances, however, these distances can differ as well. As shown in the figure, $X_i$, $Y_i$ is the detected area of the face and $CX_i$, $CY_i$ is the cropping area, wherein i=1, 2, 3, 4. Then, pixels surrounding coordinates ($X_i$, $Y_i$) of the bounding box of the detected area, are chosen to act as coordinates ($CX_i$, $CY_i$) of the cropping area. For example, if d1, d2, d3 and d4 are assumed to be equi-distant from the $X_i$, $Y_i$, such that a percentage of the detected area of the face is 60%, a percentage of the cropping area may be calculated to be 10% based on the detected area of the face. Herein, since the percentage of the cropping area is 10%, it can be understood that the distances between the cropping area and the detected area of the face are short, resulting in a small cropping area. In another example, if the percentage of the cropping area is 90%, it can be understood that the distances between the cropping area and the detected area of the face are long, resulting in a big cropping area.

A technical benefit of cropping the distance approximated area of the face of the full body pose image is that such cropping of the full body pose image provides improved results of the hair polymask. Another technical advantage of this is that it avoids cluttered segmentation, and increases segmentation accuracy. Yet another technical benefit of this is that such cropping is highly effective for images that require a close-up frame of the subject to detect better facial features.

The coordinates mapping transformation of the cropped full body pose image is performed to visually represent the change from the received full body pose image (i.e., coordinates of the full body pose image) to the cropped full body pose image (i.e., coordinates of the cropping area, or the second set of coordinates). Optionally, the processor is configured to perform the coordinates mapping transformation of the cropped full body pose image by employing at least one image mapping algorithm.

Optionally, performing coordinates mapping transformation comprises: transforming the coordinates of corner points of the rectangle of the cropping area to pixel coordinates of the corner points of the rectangle of the cropping area in the received full body pose image; remapping the transformed coordinates of corner points of the rectangle of the cropping area to pixel coordinates in the cropped full body pose image; determining location coordinates of a crop pixel in the rectangle of the cropping area; and based on the determined location coordinates of the crop pixel and the pixel coordinates of the corner points of the rectangle of the cropping area in the received full body pose image, determining location coordinates of an original pixel in the received full body pose image.

It will be appreciated that although the coordinates of corner points of the rectangle pertain to a dimension in which the rectangle is generated, the pixel coordinates of the corner points of the rectangle pertain to the dimension in which the rectangle is generated with respect to the size of the received full body pose image. This means that the pixel coordinates of corner points of the rectangle would provide a higher level of quality than the coordinates of corner points of the rectangle. Moreover, the transformed coordinates of corner points of the rectangle of the cropping area are remapped to the pixel coordinates in the cropped full body pose image in order to ensure increased accuracy. A technical benefit of remapping is that it enables obtainment of a new image (i.e., because of the transformed coordinates of corner points of the rectangle of the cropping area). This increases quality of detail and ensures accurate determination of hair pixel coordinates in the full body pose image (i.e., original image) since poor quality images are cluttered (i.e., hair pixels in such images are mixed with pixels of other regions).

Moreover, the crop pixel refers to a pixel lying within the cropping area. The location coordinates of the crop pixel are determined by mapping the transformed coordinates of corner points of the rectangle of the cropping area to pixel coordinates in the cropped full body pose image. Since the crop pixel (lying in a cropping area) maps with the original pixel (lying in the received full body pose image, as the cropping area is a portion of the received full body pose image itself), the location coordinates of the original pixel are determined by mapping the determined location coordinates of the crop pixel with the received full body pose image. A technical benefit of determining location coordinates of the original pixel in the received full body pose image is that it enables accurate detection of hair characteristics (for example, type of hair, length of hair, hair quality, etc.).

Optionally, remapping comprises defining the pixel coordinates in the cropped full body pose image according to coordinates of the top left, top right, bottom left and bottom right pixels of the cropped area. Herein, the coordinates on the top left, top right, bottom left and bottom right pixels of the cropped area map with the transformed coordinates of corner points of the rectangle of the cropping area. It will be appreciated that the coordinates on the top left, top right, bottom left and bottom right define the rectangle of the cropping area. Moreover, the location coordinates of the original pixel are determined by mapping each of the top left, top right, bottom left and bottom right pixels with the location coordinates of the respective crop pixels.

Optionally, the processor is configured to segment the region of the hair of the cropped full body pose image by employing at least one image segmentation algorithm. Examples of the at least one image segmentation algorithm include, but are not limited to, a region-based segmentation algorithm, an edge detection segmentation algorithm, a clustering-based segmentation algorithm, a mask region-based convolutional network (R-CNN) algorithm. Moreover, the region of the hair is segmented to provide a better detail of a hair region, as compared to when segmentation was not utilised. Having better detail thereby assists in accurate analysis of hair quality.

The term "hair polymask" refers to a selection (i.e., mask) used to isolate the region of hair from the cropped full body pose image. Optionally, the processor is configured to mask the region of the hair of the cropped full body pose image by employing at least one image masking technique. Examples of the at least one image masking technique include, but are not limited to, a bleeding mask, a bright star mask, a trail mask, a hole mask, a seeing mask. A technical benefit of using the hair polymask is that it isolates the hair region resulting in better detail, and thereby assisting in accurate analysis of hair quality. Optionally, the method further comprises segmenting a region of another feature in the full body pose image and masking said segmented region. Herein, another feature may be a facial feature, for example, eyes, lips, skin, etc. It will be appreciated that in this case, a polymask of another feature would be obtained, for example, an eye polymask, a lip polymask, a skin polymask, etc.

Optionally, the processor is configured to apply the masked full body pose image to the received full body pose image according to the performed coordinates mapping by employing at least one image mapping algorithm. The dynamically cropped full body pose image can now be analysed for hair quality, since the hair polymask ensures high quality, assisting in a better analysis. Optionally, the steps of segmenting the region of hair, masking the region of hair, and applying the masked full body pose image for obtaining the dynamically cropped full body pose image are performed simultaneously with the step of performing the coordinates mapping transformation of the cropped full body pose image. Optionally, the method further comprises providing the obtained dynamically cropped full body pose image to the image resource. It will be appreciated that the user can access the obtained dynamically cropped full body pose image from the image resource for conducting the hair/feature analysis.

The present disclosure also relates to the system for dynamic cropping of a full body pose image as described above. Various embodiments and variants disclosed above, with respect to the aforementioned first aspect, apply mutatis mutandis to the system.

The present disclosure also relates to the computer program for dynamic cropping of a full body pose image as described above. Various embodiments and variants disclosed above, with respect to the aforementioned first aspect, apply mutatis mutandis to the computer program.

DETAILED DESCRIPTION OF THE DRAWINGS

Referring to FIG. 1, illustrated is a flowchart depicting steps of a method for dynamic cropping of a full body pose image, in accordance with an embodiment of the present disclosure. At step 102, a computing device receives a full body pose image from an image resource, wherein the full body pose image comprises a face. At step 104, an area of the face is detected in the received full body pose image by a bounding box. At step 106, coordinates of corner points of the bounding box of the area of the face are detected. At step 108, distance approximation of the detected area of the face is performed in the received full body pose image. At step 110, the distance approximated area of the face of the full body pose image is cropped. At step 112, coordinates mapping transformation of the cropped full body pose image is performed by mapping coordinates of the cropped full body pose image in relation to the received full body pose image. At step 114, a region of hair of the cropped full body pose image is segmented. At step 116, the region of the hair of the cropped full body pose image is masked for obtaining a hair polymask of the region of the hair. At step 118, the masked full body pose image is applied to the received full body pose image according to the performed coordinates mapping for obtaining the dynamically cropped full body pose image.

Figure 2:
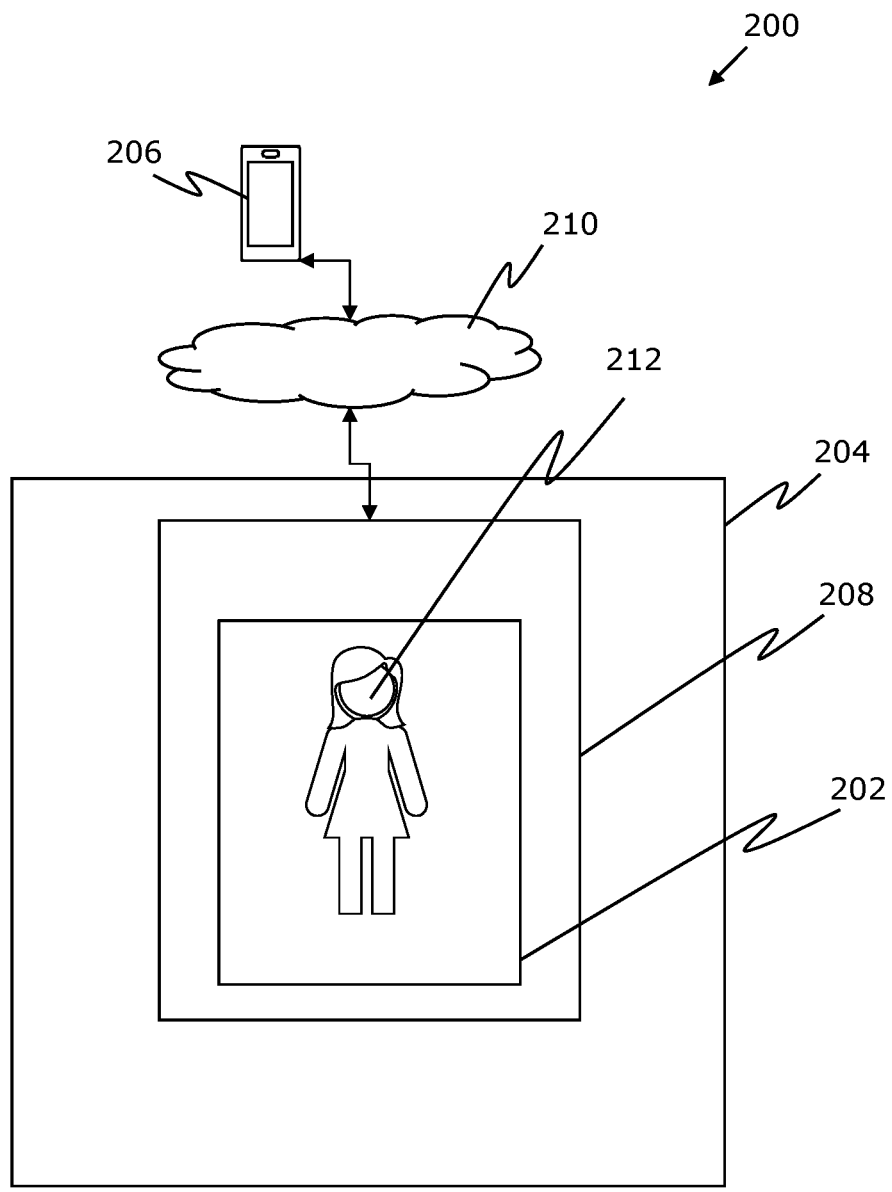
FIG. 2 illustrates an exemplary architecture of a system for dynamic cropping of a full body pose image, in accordance with an embodiment of the present disclosure.

Referring to FIG. 2, illustrated is an exemplary architecture of a system 200 for dynamic cropping of a full body pose image 202, in accordance with an embodiment of the present disclosure. The system 200 comprises a computing device 204 and an image resource 206. The computing device 204 comprises a processor 208. The computing device 204 and the image resource 206 are communicably coupled via a communication means 210. The computing device 204 receives a full body pose image 202 from the image resource 206, wherein the full body pose image 202 comprises a face 212.

FIG. 2 is merely an example, which should not unduly limit the scope of the claims herein. It will be appreciated that the system 200 is provided as an example and is not to be construed as limiting the same to specific numbers or types of components. A person skilled in the art will recognize many variations, alternatives, and modifications of embodiments of the present disclosure.

Figure 3:
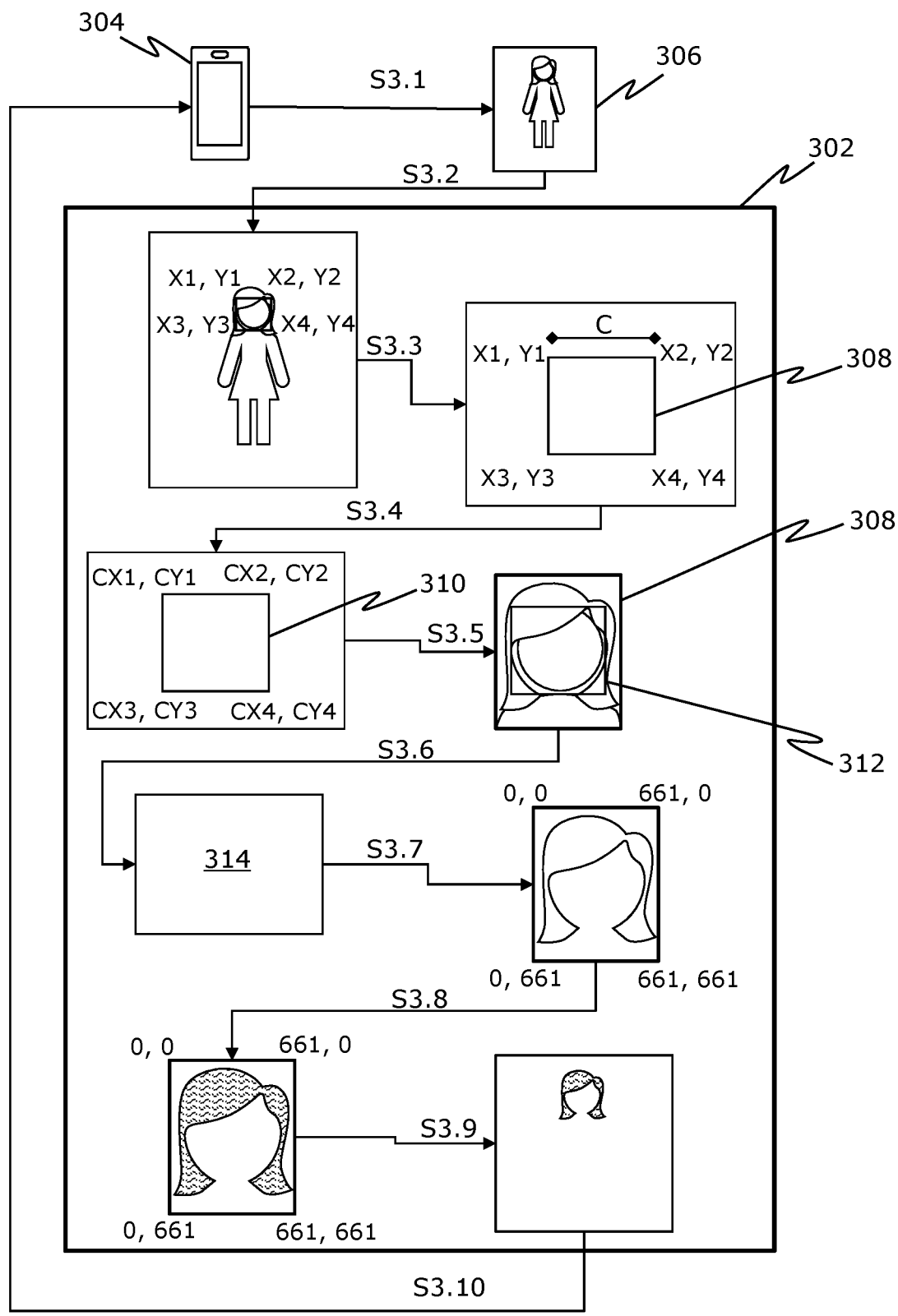
FIG. 3 illustrates a detailed process flow depicting steps of a method for dynamic cropping of a full body pose image, in accordance with an embodiment of the present disclosure.

FIG. 3 illustrates a detailed process flow depicting steps of a method for dynamic cropping of a full body pose image, in accordance with an embodiment of the present disclosure. The method for dynamic cropping of the full body pose image is performed by a computing device (not shown) having a processor 302. The processor 302 of the computing device is communicably coupled to an image resource 304. At step S3.1, the computing device receives a full body pose image 306 from the image resource 304, wherein the full body pose image 306 comprises a face. At step S3.2, an area of the face is detected in the received full body pose image by a bounding box. The bounding box is defined by its coordinates X1, Y1; X2, Y2; X3, Y3; X4, Y4. At step S3.3, coordinates of corner points of the bounding box of the area of the face are detected. The detected area of the face is represented as 308, wherein a difference C of width is shown between coordinates X1, Y1 and X2, Y2. At step S3.4, distance approximation of the detected area 310 (i.e., the cropping area) of the face is performed in the received full body pose image. Herein, coordinates of the detected area 310 are represented as CX1, CY1; CX2, CY2; CX3, CY3; CX4, CY4. At step S3.5, the distance approximated area 312 of the face of the full body pose image is cropped. At step S3.6, coordinates mapping transformation 314 of the cropped full body pose image is performed by mapping coordinates of the cropped full body pose image in relation to the received full body pose image. At step S3.7, a region of hair of the cropped full body pose image is segmented. Herein, the region is segmented within coordinates 0, 0; 661, 0; 0, 661; 661, 661. At step S3.8, the region of the hair of the cropped full body pose image is masked for obtaining a hair polymask of the region of the hair. At step S3.9, the masked full body pose image is applied to the received full body pose image according to the performed coordinates mapping for obtaining the dynamically cropped full body pose image. At step S3.10, the obtained dynamically cropped full body pose image is provided to the image resource 304.

Figure 4:
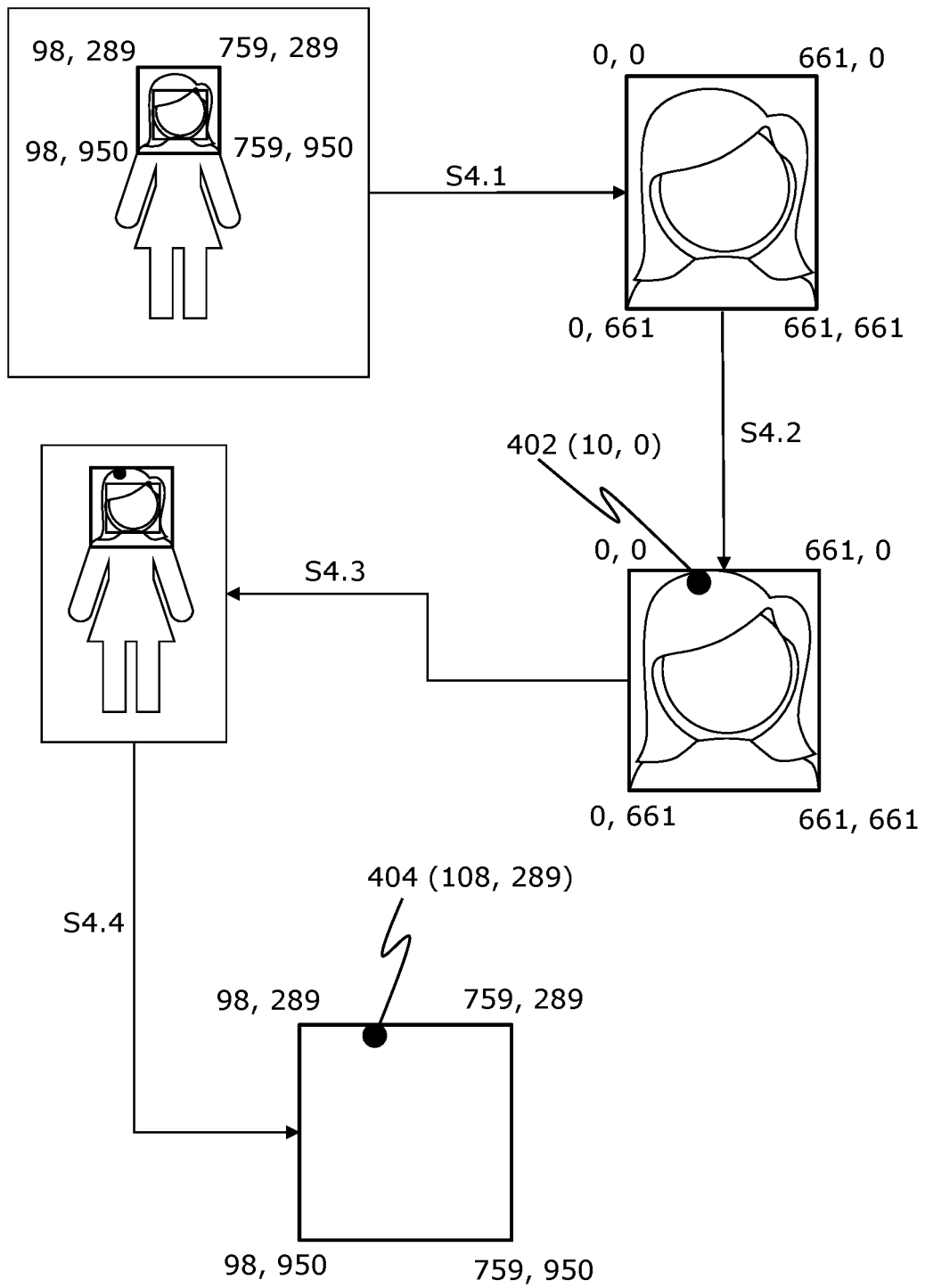
FIG. 4 illustrates a process flow depicting steps of a coordinates mapping transformation of a method for dynamic cropping of a full body pose image, in accordance with an embodiment of the present disclosure.

FIG. 4 illustrates a process flow depicting steps of a coordinates mapping transformation of a method for dynamic cropping of a full body pose image, in accordance with an embodiment of the present disclosure. At step S4.1, coordinates (98, 289; 759, 289; 98, 950; 759, 950) of corner points of a rectangle of a cropping area are transformed into pixel coordinates (0, 0; 661, 0; 0, 661; 661, 661) of the corner points of the rectangle of the cropping area in a received full body pose image. At step S4.2, the transformed coordinates (0, 0; 661, 0; 0, 661; 661, 661) of corner points of the rectangle of the cropping area are remapped to the pixel coordinates in the cropped full body pose image. At step S4.3, location coordinates (10, 0) of a crop pixel 402 in the rectangle of the cropping area are determined. At step S4.4, location coordinates (108, 289) of an original pixel 404 in the received full body pose image are determined based on the determined location coordinates of the crop pixel 402 and the pixel coordinates of the corner points of the rectangle of the cropping area in the received full body pose image. Herein, the pixel coordinates in the cropped full body pose image are remapped according to coordinates of the top left (98, 289), top right (759, 289), bottom left (98, 950), and bottom right (759, 950) pixels of the cropped area.

Figure 5:
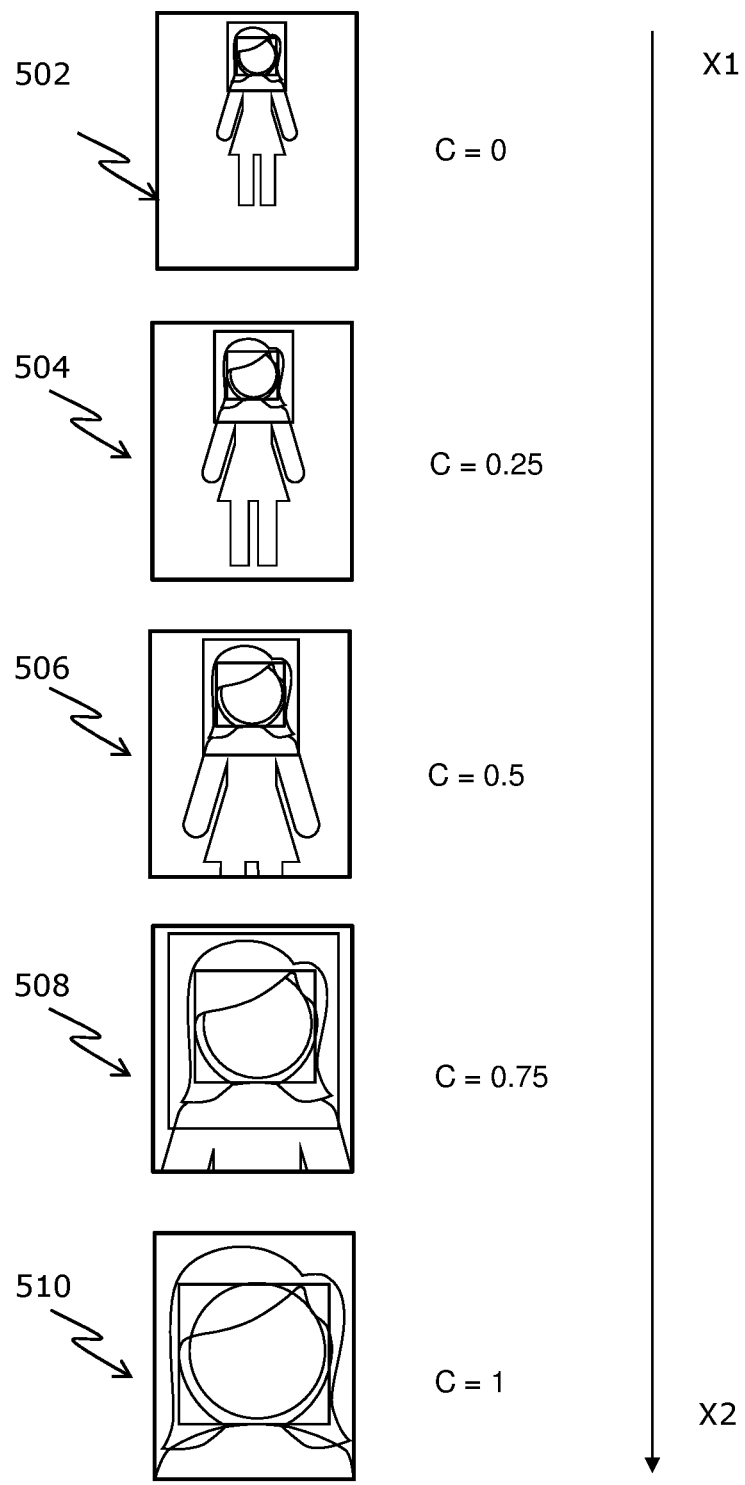
FIG. 5 illustrates normalized differences while detecting an area of a face of a method for dynamic cropping of a full body pose image, in accordance with an embodiment of the present disclosure.

FIG. 5 illustrates normalized differences while detecting an area of a face of a method for dynamic cropping of a full body pose image, in accordance with an embodiment of the present disclosure. A normalized difference in 502 is 0, a normalized difference in 504 is 0.25, a normalized difference in 506 is 0.5, a normalized difference in 508 is 0.75, and a normalized difference in 510 is 1. In the figure, X1 represents a presence of a user far from a camera at the moment when the full body pose image was captured, and X2 represents a presence of the user close to the camera at the moment when the full body pose image was captured. As shown, depending on a distance of the user's presence from the camera, a size of a detected face area is different (for example, the detected face area is large and does not require cropping in 510, however the detected face area is small and requires cropping in 502).

FIG. 6 illustrates a step of distance approximation of a detected area 600 of a face of a method for dynamic cropping of a full body pose image, in accordance with an embodiment of the present disclosure. A second set of coordinates (i.e., cropping region coordinates CX1, CX2, CX3, CX4; CY1, CY2, CY3, CY4) are generated from a first set of coordinates (i.e., X1, X2, X3, X4; Y1, Y2, Y3, Y4), as shown. Moreover, distances (i.e., d1, d2, d3, d4) between the cropping area and the detected area of the face are measured. As shown in the figure, Xi, Yi is the detected area of the face and CXi, CYi is the cropping area, wherein i=1, 2, 3, 4. Pixels surrounding coordinates (Xi, Yi) of the bounding box of the detected area, are chosen to act as coordinates (CXi, CYi) of the cropping area.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for dynamic cropping of a full body pose image, the method comprises:
   receiving in a computing device a full body pose image from an image resource, wherein the full body pose image comprises a face;
   detecting in the received full body pose image an area of the face by a bounding box;
   detecting coordinates of corner points of the bounding box of the area of the face;
   performing distance approximation of the detected area of the face in the received full body pose image;
   cropping the distance approximated area of the face of the full body pose image;
   performing coordinates mapping transformation of the cropped full body pose image by mapping coordinates of the cropped full body pose image in relation to the received full body pose image;
   segmenting a region of the hair of the cropped full body pose image;
   masking the region of the hair of the cropped full body pose image for obtaining a hair polymask of the region of the hair; and
   applying the masked full body pose image to the received full body pose image according to the performed coordinates mapping for obtaining the dynamically cropped full body pose image.

2. The method according to claim 1, wherein the distance approximation of the detected area of the face comprises:
   computing a difference C of a width of the bounding box by calculating absolute value of a difference of a second coordinate of the detected area of the face and a first coordinate of the detected area of the face;

performing normalization of the computed difference C; and comparing the normalized differences with a pre-determined minimal difference C threshold and a pre-determined maximal difference C threshold.

3. The method according to claim 1, wherein performing coordinates mapping transformation comprises:

transforming the coordinates of corner points of the rectangle of the cropping area to pixel coordinates of the corner points of the rectangle of the cropping area in the received full body pose image;

remapping the transformed coordinates of corner points of the rectangle of the cropping area to the pixel coordinates in the cropped full body pose image;

determining location coordinates of a crop pixel in the rectangle of the cropping area; and based on the determined location coordinates of the crop pixel and the pixel coordinates of the corner points of the rectangle of the cropping area in the received full body pose image, determining location coordinates of an original pixel in the received full body pose image.

4. The method according to claim 3, wherein remapping comprises defining the pixel coordinates in the cropped full body pose image according to coordinates of the top left, top right, bottom left and bottom right pixels of the cropped area.

5. A system for dynamic cropping of a full body pose image, the system comprises a computing device and an image resource, wherein the computing device is configured to carry out the steps of the method according to claim 1.

6. A computer program for dynamic cropping of a full body pose image comprising instructions adapted to perform the method according to claim 1, when the computer program is executed by a system comprising a computing device.

* * * * *